United States Patent [19]
Jamet et al.

[11] Patent Number: 4,514,371
[45] Date of Patent: Apr. 30, 1985

[54] PROCESS AND DEVICE FOR THE ACCELERATED DENSIFICATION OF A POROUS CARBONACEOUS SUBSTRATE BY DECOMPOSITION OF A HYDROCARBON SUBSTANCE

[75] Inventors: Jean Jamet, Janvry; Jean-Jacques Poupeau, Saint-Remy-les-Chevreuse; Jacqueline Omnès, Paris; Claude Le Pennec, Vincennes, all of France

[73] Assignees: Commissariat a l'Energie Atomique, Paris; Office National d'Etudes et de Recherche Aerospatiales (ONERA), Chatilcon, both of France

[21] Appl. No.: 511,724

[22] Filed: Jul. 8, 1983

Related U.S. Application Data

[63] Continuation of Ser. No. 244,877, Mar. 18, 1981, abandoned.

[30] Foreign Application Priority Data

Mar. 28, 1980 [FR] France ............................. 80 07034
Sep. 18, 1980 [FR] France ............................. 80 20089

[51] Int. Cl.³ ........................ C01B 31/04; C01B 31/02
[52] U.S. Cl. .................................. 423/449; 423/445; 423/448; 264/29.5
[58] Field of Search ............... 423/445, 448, 449; 264/29.1, 29.3, 29.5

[56] References Cited

U.S. PATENT DOCUMENTS

B 414,028  2/1976  Overholser et al. ............... 423/445
3,246,056  4/1966  Shea, Jr. et al. .................. 264/29.1
3,249,964  5/1966  Shalter ............................. 264/29.1
3,419,645  12/1968  Pietzka et al. ..................... 264/29.5
3,517,092  6/1970  Peterson ........................... 264/29.5
4,226,900  10/1980  Carlson ............................ 264/29.5

FOREIGN PATENT DOCUMENTS 1335127  10/1973  United Kingdom ............... 423/448

OTHER PUBLICATIONS

Chard et al, Advanced High Pressure Graphite Processing Technology, Graphite Processing Technology, ACS Symposium Serials, No. 21, Chapter 14, 1974, pp. 155-171.
Y Primary Examiner—Gary P. Straub
Attorney, Agent, or Firm—Oblon, Fisher, Spivak, McClelland & Maier

[57] ABSTRACT

The present invention relates to a process and device for the accelerated densification of a porous carbonaceous substrate, of the type consisting in decomposing a hydrocarbon substance in the presence of said substrate under high pressure and at high temperature, decomposition being effected inside a closed reactor allowing the elimination of the hydrogen emitted during the reaction as it is produced, the walls of said reactor having the necessary suppleness for the inner volume thereof to be adapted at any instant, under the effect of the pressure applied, to the volume of the liquid phase which it contains, wherein the hydrocarbon substance to be decomposed is chosen from the group comprising pitches, acenaphthylene, phenanthrene or mixtures of these products. The invention also relates to a process for preparing said substance.

1 Claim, 4 Drawing Figures

PROCESS AND DEVICE FOR THE ACCELERATED DENSIFICATION OF A POROUS CARBONACEOUS SUBSTRATE BY DECOMPOSITION OF A HYDROCARBON SUBSTANCE

This is a continuation of application Ser. No. 244,877 filed Mar. 18, 1981 now abandoned.

The present invention relates to the manufacture of compact carbonaceous materials by densification of porous substrates, effected by decomposition of hydrocarbon products, particularly pitches, at high temperature and high pressure.

"Densification" is understood to mean an operation consisting in incorporating carbon in a porous substrate and it is with this meaning that the term will be used in the following specification.

The most recent technique for making compact carbonaceous materials, such as carbon-carbon composites for example, preferably employs pitches under high pressure. The latter, essentially constituted by carbon and hydrogen, have a softening point towards 70°–100° C. Beyond, they liquefy and remain stable up to about 350°–400° C.: from this temperature, they begin to decompose with emission of hydrogen and volatile saturated hydrocarbons, whilst a mesophase forms in the liquid mass.

The latter is in the form of small spheres, affinitive to liquid crystals, which enlarge and, by coalescence, invade all the liquid phase. Once the reaction has terminated, the substance to be densified undergoes a graphitization treatment towards 2600° C. and the cycle is started again until the desired density is obtained.

In order to increase the carbon yields, this conversion is carried out in crimped capsules under high pressure.

As the heretofore used capsules were very sparingly permeable, the gases produced in the course of the reaction could provoke a nucleation within the matter, this nucleation moving towards the walls and giving, at the end, a certain porosity to the product obtained. Moreover, the number of cycles necessary for obtaining the final product of given density may be more or less large.

This is why processes have recently been carried out which use capsules of which the walls are made of a hydrogen-permeable material: this is the case, for example, of the process described in French Pat. No. 2 096 144.

In fact, the elimination of the hydrogen as it is produced promotes both the decomposition of the hydrocarbon substance and that of the volatile hydrocarbons. The yield of the decomposition reactions is thus improved by reducing the porous volume provoked by the formation of gaseous nucleations within the matter: manufacturing costs are therefore reduced by reducing the number of cycles necessary, whilst obtaining a more homogeneous product.

On the other hand, the walls of the presently used capsules are sufficiently supple to be able to operate under high pressure. This makes it possible to improve the yield of the reactions further by allowing operation under very high pressure without risk of rupture for the reactor since the outside pressure is constantly balanced by that of the incompressible liquid mass which it contains.

However, the quality of the products obtained depends a great deal on the choice of the hydrocarbon substance to be decomposed.

It is an object of the present invention to provide a process for the densification of a porous carbonaceous substrate employing a substance to be decomposed perfectly adapted to the result which it is desired to obtain.

According to the main feature of this process, of the type consisting in decomposing a hydrocarbon substance in the presence of said substrate under high pressure at at high temperature, the decomposition being effected inside a closed reactor allowing the elimination of the hydrogen emitted during the reaction as it is produced, the walls of said reactor having the necessary suppleness for the inner volume thereof to be adapted, at each instant, under the effect of the pressure applied, to the volume of the liquid phase which it contains, is characterised in that the hydrocarbon substance to be decomposed is chosen from the group comprising pitches, acenaphthylene, phenanthrene or mixtures of these products.

According to another feature of this process, it comprises at least one cycle including the following steps of:

placing the porous substrate in a capsule serving as reactor, the capsule being placed in a chamber wherein a vacuum is created, the hydrocarbon substance to be decomposed is poured, previously liquefied, into the capsule, cooling, returning the pressure to atmospheric pressure and withdrawing the capsule from the chamber, closing the capsule with a lid which is welded, creating a vacuum in said capsule and placing it in a high pressure chamber where the temperature is taken to about 200° C., raising the pressure inside said high pressure chamber up to a value of the order of 700 to 1000 bars whilst the temperature is taken up to about 600°–700° C., analysing the gases issuing from the high pressure chamber and stopping the reaction when virtually no more hydrogen is being emitted, then subjecting the substrate to a treatment of graphitization at a temperature of the order of 2600° C.

One of the difficulties in carrying out the process comes from the fact that certain pitches contain, in variable proportion, free carbon (phase α), i.e. carbon atoms not bonded to other atoms: although their presence is favourable for the densification step, it is undesirable for the graphitization step. In fact, the free carbon prevents the coalescence of the mesophase spheres and has a delaying action during the graphitization step.

Free carbon was, up to the present time, reputed to have another drawback; in fact, the fibrous substrates constitute filters for the solid suspensions, even when the particles of the suspensions are very fine and, under the normal conditions of temperature and pressure usually employed in this type of technique, the walls of the substrate clog as soon as impregnation begins.

Now, the inventors have shown that, contrary to what is generally admitted, it was possible to use pitches or other hydrocarbon substances containing a high rate of free carbon; if operation is carried out under a sufficiently high pressure (700–1000 bars) the above-indicated clogging can be avoided.

In the prior art, carbon-carbon composites of exceptional quality were, in fact, not especially sought insofar as these materials were used in particular for making electrodes and the fibrous armatures available would not have withstood the stresses due to too high a pressure.

The substances containing free carbon and more particularly coal tar pitches, make it possible to obtain products having excellent mechanical properties explained by an extremely fine grain texture (absence of coalescence of the mesophase) and a perfect power of adhesion on the substrate explained by the high wettability of the highly aromatic coal tar pitches.

Therefore, if it is not a perfect graphitization which is sought, but especially good mechanical qualities, substances containing free carbon will advantageously be used.

If, on the contrary, a perfect graphitization is desired, the substance will have to be exempt of free carbon. In this case, the hydrocarbon substance to be decomposed, or precursor of pure graphite, may be a pitch having an atomic C/H ratio greater than 1.4 and preferably between 1.4 and 1.9 or a pure product such as acenaphthylene or phenanthrene for example.

However, these products present several drawbacks.

Pitches are easily available and are cheap, but they are sub-products and consequently contain numerous impurities.

They contain sulfur which not only risks deteriorating the metal reactors, but provokes a phenomenon called "puffing effect" from about 1300°/1400° C.: at this temperature, it starts suddenly, this provoking abrupt dimensional variations of the matrix and rendering the graphitization step more delicate.

Pure products such as acenaphthylene and phenanthrene contain neither impurities nor free carbon, but they are very exensive.

It is also an object of the present invention to provide a process which overcomes these drawbacks by using as hydrocarbon substance to be decomposed an inexpensive product which contains only very few impurities.

According to the main feature of this process, the hydrocarbon substance to be decomposed comprises a mixture of acenaphthylene and a pitch having an atomic C/H ratio greater than 1.4 and containing less than 0.1% of components insoluble in quinolines, about 20% of components insoluble in toluene, less than 0.2% of sulfur, less than 0.1% of oxygen and less than 0.1% of nitrogen, the proportion of acenaphthylene in the mixture being of the order of 5 to 40% by weight.

It is also an object of the invention to provide a process for preparing the hydrocarbon substance to be decomposed, used in the above process. According to the main feature of this process for preparation, it comprises the following steps of:

grinding the acenaphthylene and the pitch separately, dry and at ordinary temperature, until powders are obtained whose grains have dimensions smaller than 100 μm, still dry and at ordinary temperature, mixing the two powders, the proportion of acenaphthylene being between 5 and 40% by weight and degassing the mixture in a reactor subjected to permanent stirring, at a temperature of the order of 140° C. until the residual pressure in the reactor is of the order of 5 mm Hg.

The substance to be decomposed must not only have a composition similar to that of pitch indicated hereinabove, but, in addition, it must present the following characteristics:

coke yield (Conradson) of the order of 50%,
viscosity at 200° C. less than 400 cps
ash content lower than 0.15%

Certain petroleum pitches have a composition and characteristics very close to those sought, particularly as far as the low sulfur content is concerned.

When such a pitch is used alone, a slight development of the mesophase and a relatively high contraction at high temperature are observed. However, if it is mixed with acenaphthylene, a product with particularly advantageous properties is obtained.

Firstly, the existence of a eutectic composition corresponding to 70% of pitch and 30% of acenaphthylene has been demonstrated. There is no separation of the constituents of the mixture during the melting or solidification phases. On the other hand, this mixture has a softening point close to ambient temperature, this simplifying the preliminary steps of the process.

By way of example, the densification has been effected of a multidirectional fibrous carbon substrate with three different precursors. The mechanical test best characterising the bonds made by the carbon matrix between the strands of fibres consists in measuring the shearing stress of the strands during extraction thereof in cold traction. The results obtained with the three different precursors were as follows:

petroleum pitch with 1.7% of sulfur: 0.40 daN/mm$^2$ petroleum pitch with 0.1% of sulfur, such as the one used in the process of the invention, used alone: 0.75 daN/mm$^2$ mixture used in the process of the invention: 0.93/daN/mm$^2$.

This clearly shows that the best adhesion between the strands and the graphite matrix is obtained with the product used in the process according to the invention.

Moreover, the test which has been carried out has shown other particularly advantageous properties:

very broad development of the mesophase, identical to that obtained with pure acenaphthylene, a coke yield identical to that of conventional pitches with high pressure carbonization, a remarkably slight contraction beyond 1000° C., this bringing about a reduction of the duration of the heat treatment, a complete graphitization at a relatively low temperature, less than or equal to 2600° C.

It is therefore seen that the product, precursor of graphite, used in the process according to the invention brings numerous advantages, the principal ones being as follows:

moderate cost price due to the use of inexpensive pitch in a large proportion (about 70% or more), simplified execution due to the very low temperature of softening of the eutectic (corresponding to about 30% of acenaphthylene), absence of puffing effect as a pure mixture is mixed with a pitch containing very little sulfur, finally a good coke yield and a behaviour during the graphitization operations which enables the duration and temperature thereof to be reduced, hence an appreciable saving of energy.

The present invention also relates to a device for carrying out the process. According to a preferred embodiment, this device is characterised in that it comprises an aneroid capsule of which the walls, made of a hydrogen-permeable material, are thin and corrugated.

In fact, to obtain a good permeability of the reactor with respect to hydrogen, not only a material which is permeable to this gas must be chosen, but, in addition, the surface/thickness ratio of the walls of the reactor should be increased as much as possible, hence the shape chosen. Moreover, this shape renders the capsule fairly supple so that it may be deformed in the course of the treatment under the effect of the pressure applied, without risk of cracking. Finally, such structures have the advantage of being available on the market in a very wide range of dimensions and materials, this reducing the cost of manufacture of such capsules.

The invention will be more readily understood on reading the following description with reference to the accompanying drawings, in which.

Figure 1:
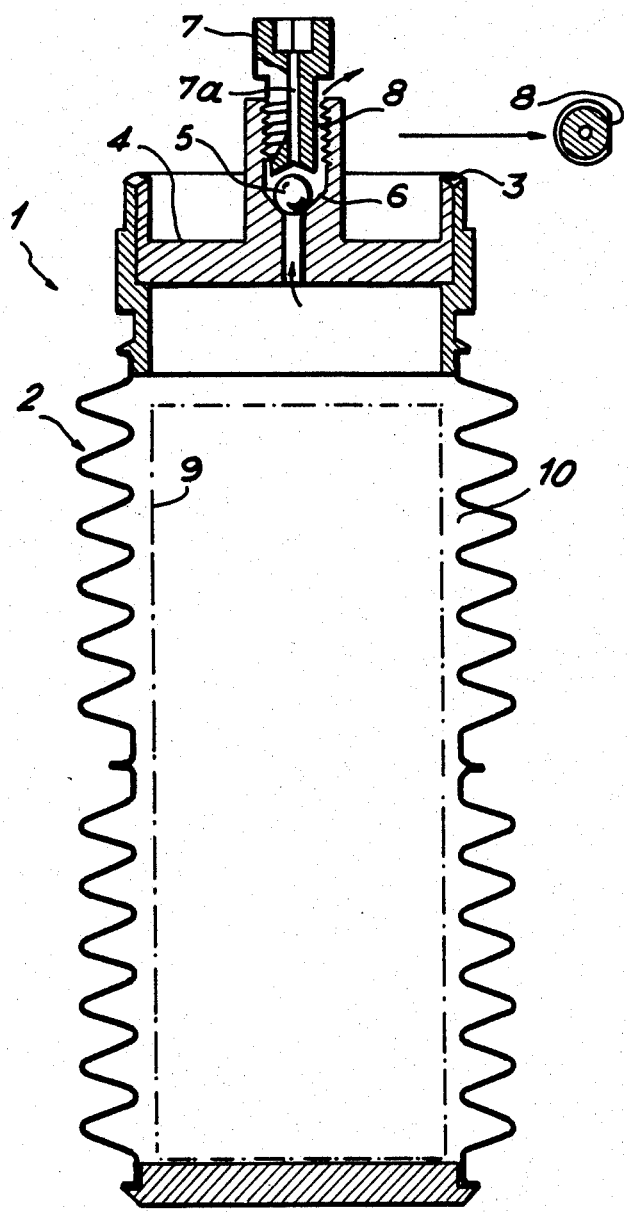
FIG. 1 shows a view in section of the aneroid capsule used in the invention.

Referring now to the drawings, FIG. 1 shows an aneroid capsule 1 having thin, corrugated walls 2. This shape makes it possible considerably to increase the surface/thickness ratio of the walls of the capsule, rendering the latter more permeable to hydrogen on condition, of course, that the material constituting the capsule allows the diffusion of this gas. In known manner, a good permeability is obtained by choosing a metal such as nickel or stainless steel as material constituting the capsule. If the economic aspect is not important, other materials such as palladium or an alloy such as palladium-silver for example, may be used.

FIG. 1 also shows the closure device 3 constituted by a lid 4 welded to the capsule 1, tightness being ensured by means of the ball 5 which is applied on the cone 6 by means of the screw 7, the latter having a flat portion 8 enabling a vacuum to be created. This latter operation is also facilitated by the central hole 7a which passes through the screw 7.

The process is carried out as follows: the product 9 to be densified, for example an armature of carbon fibres, is firstly placed, in conventional manner, in the unstoppered capsule 1. Said capsule is then disposed in a chamber wherein a vacuum is created, then the capsule is filled with previously liquefied pitch 10, the residual pressure in the chamber being of the order of 5 to 10 mm Hg. In fact, for the pitch to penetrate well in the substrate, this operation must be carried out in vacuo and the liquid pitch must be left in contact with the substrate for a sufficient length of time. Cooling is then effected and pressure is returned to atmospheric pressure.

The process, essentially used for densifying carbon-carbon composites, may naturally be applied to other substances and the starting carbonaceous substrate may either be an armature of carbon fibres or any carbonaceous product of which it is desired to increase the density.

Figure 2:
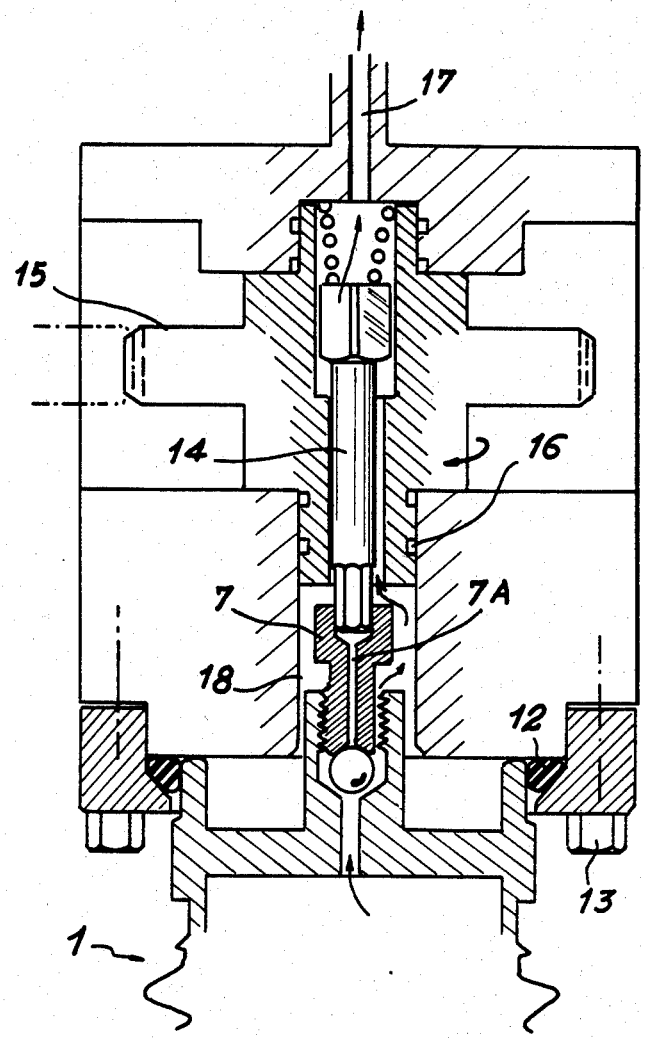
FIG. 2 shows a view in section of the device for creating a vacuum in the capsule of FIG. 1.

The lid 4 is then welded on the capsule 1 and a vacuum is created by means of the system shown in FIG. 2. A cap 11 is placed at the upper part of the capsule 1, tightness being ensured due to the O-ring 12 maintained by the screws 13. On the other hand, the screw 7 is tightened with the aid of a telescopic wrench 14, the latter being manoeuvred by the control system 15: tightness between the latter and the cap 11 is ensured by means of the O-rings 16. A conduit 17 connected to a vacuum pump (not shown) passes through the system 15.

When the vacuum is created in the capsule 1 and in the inner space 18 of the cap 11, the control system 15 is actuated and the screw 7 is tightened to block the ball 5 on the cone 6. A small space remains empty in the upper part of the capsule, the residual pressure being of the order of 5 to 10 mm Hg.

This vacuum-creating device is then withdrawn and the capsule is placed in a high pressure chamber which is heated to 200° C.; a level must be respected at this temperature to ensure that the pitch has melted.

As carried out in the processes of the prior art, the temperature is then raised progressively to about 600°–700° C., whilst the capsule is subjected to high argon pressure (of the order of 700 to 1000 bars). Under the effect of this pressure, the capsule is crushed, this eliminating the empty space created previously. The interior of the capsule is then entirely filled with the liquid phase. The considerable suppleness of the aneroid capsule according to the invention makes it possible to operate at very high pressures (up to 2000 bars for example if the installation allows this) without risk of rupture for the capsule since the outside pressure will always be balanced by that of the liquid that it contains. Argon scavenging is necessary to extract the hydrogen from the chamber, so that the partial pressure thereof outside the capsule is always as low as possible. Continuous analysis of the gases issuing from the high pressure chamber enables the rate of flow of hydrogen to be known at any instant.

Figure 3:
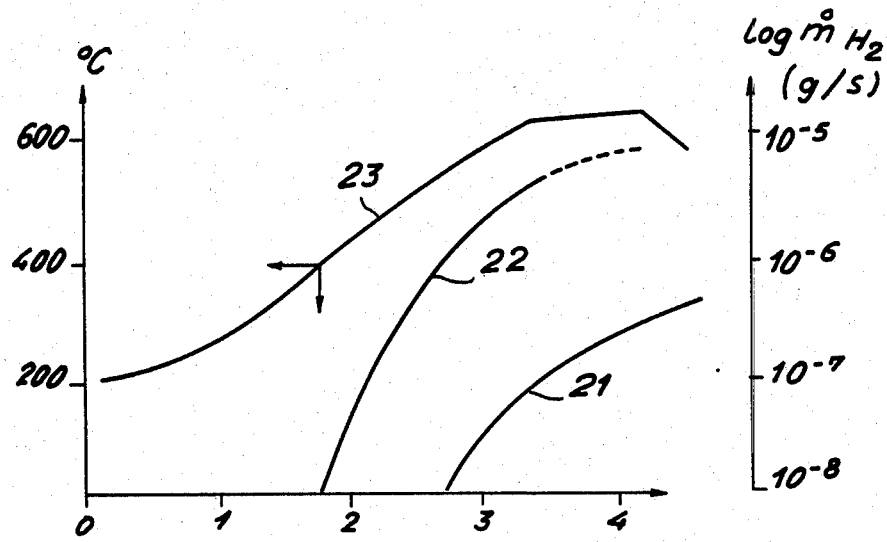
FIG. 3 shows, on a logarithmic scale, the curves giving the rate of flow, pertaining to the mass, of hydrogen (in grams/second) as a function of the time (in hours) for two types of capsules.

This rate of flow is shown, on a logarighmic scale and in grams/second as a function of the time in hours and the rise in temperature in FIG. 3 for two types of capsule of the same volume allowing a comparison between:

a straight capsule with smooth walls, made of stainless steel (curve 21) of the type used in the prior art, and an aneroid capsule with thin, corrugated walls made of nickel (curve 22) according to the present invention. This Figure also shows the evolution of the temperature as a function of time (curve 23).

The experiment described here was carried out under a pressure of 700 bars. The pitch used is a coal tar pitch having a softening point (KS or Ring-Ball) at 90° C., and containing 30% of free carbon (phase α); in fact, the latter promotes the densification reaction. On the other hand, this pitch has a carbon yield of 40% and an atomic carbon/hydrogen ratio equal to 1.89.

FIG. 3 shows that the nickel aneroid capsule considerably increases the yield of the reaction with respect to the conventional straight stainless steel capsule: with the former, the diffusion of hydrogen begins much earlier, as soon as the temperature reaches a value close to 400° C. at which the pitch begins to decompose, whilst with the latter, nothing occurs below 500° C. Moreover, at a given instant, the rate of flow of hydrogen is about 100 times greater with the nickel aneroid capsule than with the stainless steel straight capsule.

After about 5 hours, the rate of flow of hydrogen decreases considerably or stops, and the experiment is stopped; the substrate is then extracted from the capsule and subjected to a heat treatment at 2600° C. to crystallise the carbon in the graphite system.

The operations are then recommenced by repeating the cycle as many times as is necessary to obtain the final density desired.

Figure 4:
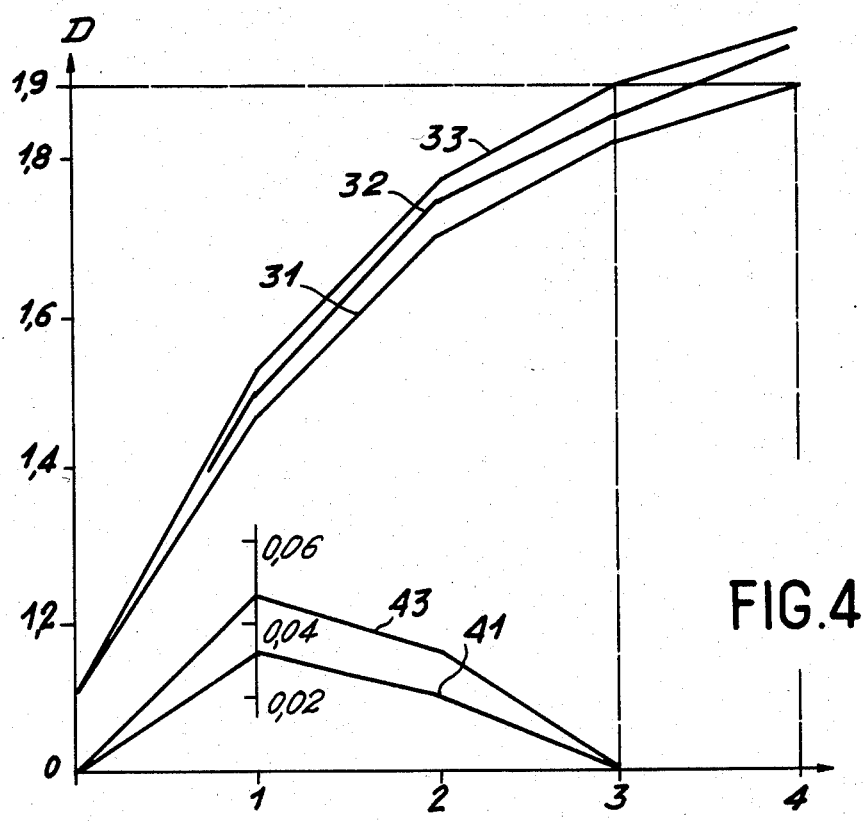
FIG. 4 shows the curves giving the increase in density of the substrate after each cycle for three different types of capsule.

FIG. 4 indicates the density of the product obtained after each densification cycle for the same substrate of initial density 1.12 with three types of capsule:

straight stainless steel capsule (curve 31) according to the prior art, stainless steel aneroid capsule (curve 32)

nickel aneroid capsule (curve 33).

It will be seen that, for the same starting product, the nickel aneroid capsule makes it possible to obtain a final density of 1.90 after three cycles whilst four are required with the straight stainless steel capsule.

On the other hand, a comparison of the curves 31 and 32 shows, for the same material constituting the capsule, the improvement made by the structure with thin, corrugated walls with respect to the structure with smooth walls.

A comparison of curves 32 and 33 shows that, for the same structure of the capsule, the nickel is more efficient than the stainless steel.

Curves 41 and 43 give the gain in density for each cycle with the straight stainless steel capsule and the nickel aneroid capsule, respectively.

These curves show that, after the first cycle, the increase in density is much more considerable with the nickel aneroid capsule (curve 43) than with the stainless steel straight capsule (curve 41). In the course of the following cycles, the gain in density decreases and is finally annulled when the substrate attains its maximum density.

The invention therefore makes it possible to attain the desired purpose which is the rapid and economic obtaining of compact carbonaceous materials.

It is obvious that the present invention is not limited to the embodiment described hereinabove and that other embodiments are possible.

The hydrogen may be eliminated by trapping with the aid of a titanium sponge or with palladium black, two materials in which hydrogen is highly soluble.

Other reactor forms are also possible, for example flattened, circular capsules having corrugated walls, of the type used in aneroid barometers, may be envisaged.

Applications are numerous and varied, particularly for manufacture of compact carbonaceous materials of any shape and size: these and more especially carbon-carbon composites are virtually the only ones which may be used in domains where a high mechanical strength and a high resistance to abrasion at high temperature are necessary. Mention may further be made as example, of the manufacture of electrodes, brakes for automobile vehicles or aircraft, possibly medical prosthesis since carbon is compatible with living tissues.

What is claimed is:

1. A process for the accelerated densification of a porous carbonaceous substrate comprising decomposing a hydrocarbon substance in the presence of said substrate under high pressure and at a high temperature, decomposition being effected inside a closed reactor allowing the elimination of hydrogen as it is produced during the reaction, the walls of said reactor having the necessary suppleness for the inner volume thereof to be adapted at each instant under the effect of the pressure applied to the volume of a liquid phase which it contains, the hydrocarbon substance to be decomposed being a substance containing free carbon in the amount of about 30% by weight.

* * * * *